(12) United States Patent
Thacker et al.

(10) Patent No.: US 11,757,653 B2
(45) Date of Patent: *Sep. 12, 2023

(54) SYSTEMS AND METHODS FOR DETERMINING AUTHENTICITY OF NON-FUNGIBLE DIGITAL ASSETS

(71) Applicant: MYTHICAL, INC., Sherman Oaks, CA (US)

(72) Inventors: Cameron Thacker, Sherman Oaks, CA (US); Andrew Royer, Los Angeles, CA (US); John Linden, Sherman Oaks, CA (US); Liwen Kao, Pasadena, CA (US)

(73) Assignee: Mythical, Inc., Sherman Oaks, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/306,814

(22) Filed: May 3, 2021

(65) Prior Publication Data

US 2021/0351937 A1 Nov. 11, 2021

Related U.S. Application Data

(63) Continuation of application No. 15/929,542, filed on May 8, 2020, now Pat. No. 11,044,098.

(51) Int. Cl.
*H04L 9/32* (2006.01)
*G06Q 10/10* (2023.01)
(Continued)

(52) U.S. Cl.
CPC ............ *H04L 9/3247* (2013.01); *A63F 13/73* (2014.09); *G06F 16/27* (2019.01); *G06Q 10/02* (2013.01); *G06Q 10/10* (2013.01); *G06Q 30/0185* (2013.01); *H04L 9/14* (2013.01); *H04L 9/3073* (2013.01); *G06Q 2220/10* (2013.01)

(58) Field of Classification Search
None
See application file for complete search history.

(56) References Cited

U.S. PATENT DOCUMENTS 6,591,250 B1 7/2003 Johnson
8,972,369 B2 3/2015 Vignocchi
(Continued)

OTHER PUBLICATIONS

Koch, Rudy; "Introducing dGoods", Feb. 10, 2019 (Year: 2019).
(Continued)

*Primary Examiner* — William J. Goodchild
(74) *Attorney, Agent, or Firm* — ESPLIN & ASSOCIATES, PC

(57) ABSTRACT

Systems and methods for determining authenticity of non-fungible digital assets are disclosed. Exemplary implementations may: store information, wherein the stored information includes information regarding a given type of digital assets, including a first digital asset; generate a first quantity of encoded information, based on encoding an identifier of a smart contract and an asset-specific identifier that identifies the first digital asset; generate a digital signature of the first quantity of encoded information, wherein the digital signature is based on a private key associated with the smart contract; and record the first quantity of encoded information and the digital signature as part of the metadata of the first digital asset.

17 Claims, 3 Drawing Sheets

(51) Int. Cl.
  *G06Q 30/018* (2023.01)
  *G06Q 10/02* (2012.01)
  *H04L 9/14* (2006.01)
  *H04L 9/30* (2006.01)
  *A63F 13/73* (2014.01)
  *G06F 16/27* (2019.01)

(56) References Cited

U.S. PATENT DOCUMENTS

| | | |
|---|---|---|
| 9,430,791 B1 | 8/2016 | Sutton-Shearer |
| 11,062,284 B1 | 7/2021 | Cunningham |
| 11,154,783 B1 | 10/2021 | Koch |
| 2009/0276332 A1 | 11/2009 | Gharabally |
| 2011/0302037 A1 | 12/2011 | Sutton-Shearer |
| 2014/0094283 A1* | 4/2014 | Sanford ............ G07F 17/3244 463/25 |
| 2015/0310476 A1* | 10/2015 | Gadwa ............ G06Q 30/0226 705/14.27 |
| 2016/0098723 A1 | 4/2016 | Feeney |
| 2016/0140653 A1* | 5/2016 | McKenzie ............ G07F 7/082 705/69 |
| 2016/0292680 A1 | 10/2016 | Wilson, Jr. |
| 2016/0325180 A1 | 11/2016 | Nelson |
| 2017/0052676 A1 | 2/2017 | Pulier |
| 2017/0127216 A1 | 5/2017 | Coyne |
| 2017/0206523 A1* | 7/2017 | Goeringer .......... G06Q 20/3827 |
| 2018/0062848 A1* | 3/2018 | Gorman ............ H04L 9/3239 |
| 2018/0255090 A1* | 9/2018 | Kozloski ............ H04L 67/535 |
| 2019/0205894 A1* | 7/2019 | Gonzales, Jr. ..... G06Q 20/3829 |
| 2019/0299105 A1 | 10/2019 | Knight |
| 2020/0184547 A1 | 6/2020 | Andon |
| 2020/0294011 A1* | 9/2020 | Robertson ............ H04L 63/12 |
| 2021/0174625 A1 | 6/2021 | Pinkerton |
| 2021/0201336 A1 | 7/2021 | Mallett |
| 2021/0217001 A1 | 7/2021 | Harrison |

OTHER PUBLICATIONS

Brightman, James; "Activision Blizzard Vets Launch Mythical Games With Focus on Player-Owned Economies"; GameDaily.biz, Jun. 11, 2018. (Year: 2018).

Business Wire; "Mythical Games Announces integration of Microsoft Azure Blockchain Tokens with dGoods Standard"; Bloomberg, Jun. 11, 2019. (Year: 2019).

* cited by examiner

SYSTEMS AND METHODS FOR DETERMINING AUTHENTICITY OF NON-FUNGIBLE DIGITAL ASSETS

FIELD OF THE DISCLOSURE

The present disclosure relates to systems and methods for providing authenticity of digital assets that are not fungible.

BACKGROUND

Client computing devices are known. Ledgers are known. Fungible tokens used on a blockchain are known, such as Bitcoin.

SUMMARY

One aspect of the present disclosure relates to a system configured to provide authenticity of digital assets that are not fungible. The system may include electronic storage configured to electronically store information. The stored information may include information regarding a given type of digital assets. The given type of digital assets may be implemented as a smart contract on a distributed ledger. The smart contract may be associated with a keypair of cryptographic keys including a public key and a private key. The stored information may include a set of a limited number of digital assets of the given type that are not fungible such that individual ones of the set of the limited number of digital assets are distinguishable. The set may include a first digital asset of the given type. The first digital asset may be associated with metadata pertaining to the first digital asset. The system may include one or more hardware processors configured via machine-readable instructions. The one or more hardware processors may be configured to generate a first quantity of encoded information. Generation may be based on encoding an identifier of the smart contract and an asset-specific identifier that identifies the first digital asset. The one or more hardware processors may be configured to generate a digital signature of the first quantity of encoded information. The digital signature may be based on the private key associated with the smart contract. The one or more hardware processors may be configured to record the first quantity of encoded information as part of the metadata of the first digital asset. The one or more hardware processors may be configured to record the digital signature as part of the metadata of the first digital asset.

Another aspect of the present disclosure is related to a system configured to determine authenticity of digital assets that are not fungible. The system may include one or more hardware processors configured via machine-readable instructions. The one or more hardware processors may be configured to obtain an identifier of a smart contract. The smart contract may implement a given type of a limited number of digital assets on a distributed ledger that are not fungible such that individual ones of the set of the limited number of digital assets are distinguishable. The smart contract may be associated with a keypair of cryptographic keys including a public key and a private key. The limited number of digital assets may include a first digital asset. The one or more hardware processors may be configured to obtain metadata of the first digital asset. The metadata may be associated with and at least in part specific to the first digital asset. The metadata may include an asset-specific identifier that identifies the first digital asset. The one or more hardware processors may be configured to extract a digital signature and a first quantity of extracted information from the metadata. The one or more hardware processors may be configured to verify whether the digital signature corresponds to the first quantity of extracted information. Verification may be based on the public key.

Another aspect of the present disclosure relates to a method for providing authenticity of digital assets that are not fungible. The method may include storing information in electronic storage. The stored information may include information regarding a given type of digital assets. The given type of digital assets may be implemented as a smart contract on a distributed ledger. The smart contract may be associated with a keypair of cryptographic keys including a public key and a private key. The stored information may include a set of a limited number of digital assets of the given type that are not fungible such that individual ones of the set of the limited number of digital assets are distinguishable. The set may include a first digital asset of the given type. The first digital asset may be associated with metadata pertaining to the first digital asset. The method may include generating a first quantity of encoded information. Generation may be based on encoding an identifier of the smart contract and an asset-specific identifier that identifies the first digital asset. The method may include generating a digital signature of the first quantity of encoded information. The digital signature may be based on the private key associated with the smart contract. The method may include recording the first quantity of encoded information as part of the metadata of the first digital asset. The method may include recording the digital signature as part of the metadata of the first digital asset.

Another aspect of the present disclosure relates to a method for obtaining an identifier of a smart contract. The smart contract may implement a given type of a limited number of digital assets on a distributed ledger that are not fungible such that individual ones of the set of the limited number of digital assets are distinguishable. The smart contract may be associated with a keypair of cryptographic keys including a public key and a private key. The limited number of digital assets may include a first digital asset. The method may include obtaining metadata of the first digital asset. The metadata may be associated with and at least in part specific to the first digital asset. The metadata may include an asset-specific identifier that identifies the first digital asset. The method may include extracting a digital signature and a first quantity of extracted information from the metadata. The method may include verifying whether the digital signature corresponds to the first quantity of extracted information. Verification may be based on the public key.

As used herein, any association (or relation, or reflection, or indication, or correspondency) involving servers, processors, client computing devices, assets, types of assets, contracts, cryptographic keys, encryptions, encodings, hash values, hash functions, quantities of information, verifications, validations, metadata, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
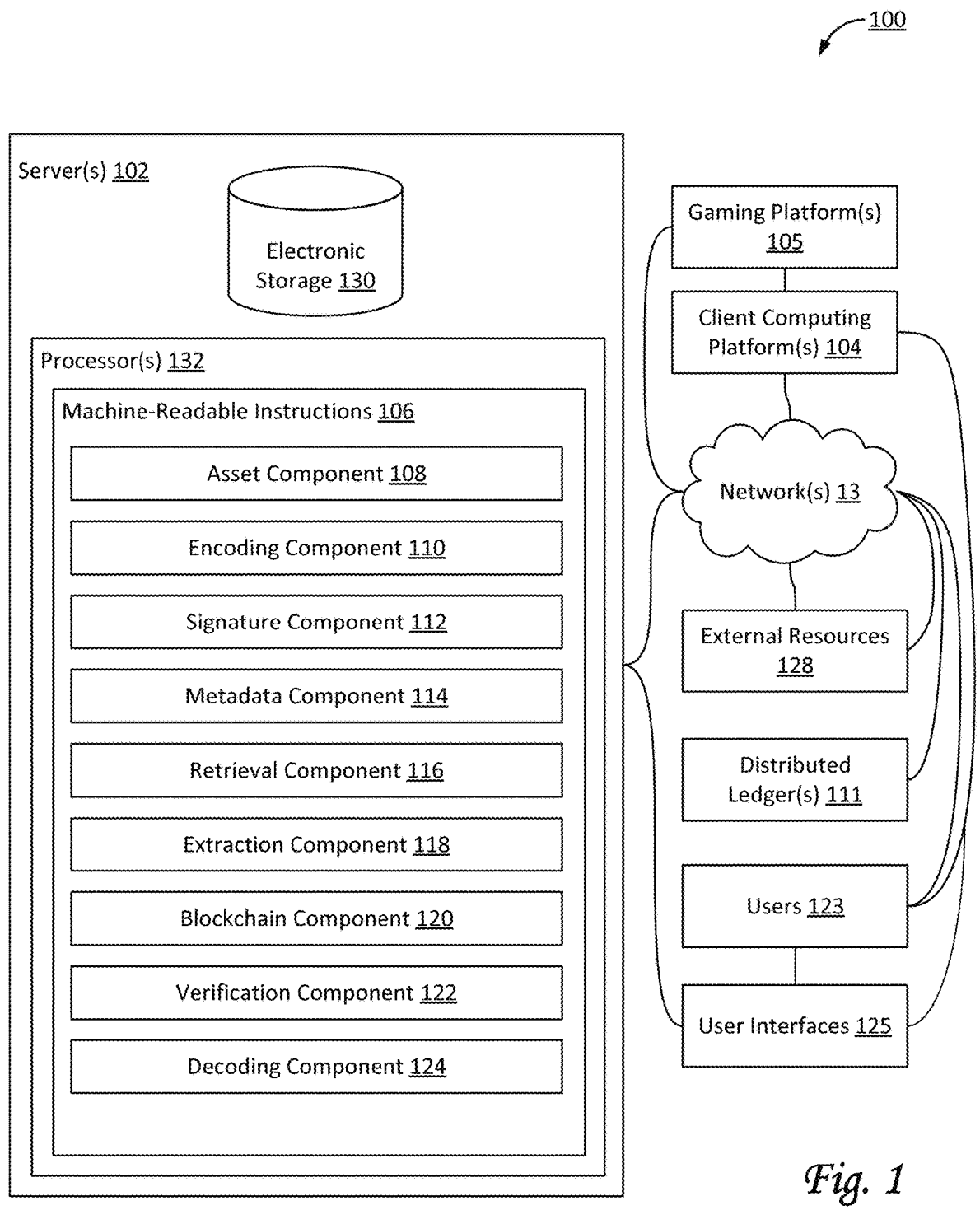
FIG. 1 illustrates a system configured to provide and/or determine authenticity of digital assets that are not fungible, in accordance with one or more implementations.

FIG. 1 illustrates a system 100 configured for provide and/or determine authenticity of digital assets that are not fungible, in accordance with one or more implementations. As used herein, a digital asset is fungible if it is functionally and/or physically indistinguishable from another digital asset. For example, a payment token such as a Bitcoin may be a fungible digital asset. A digital asset may be non-fungible if it is unique, or one-of-a-kind. For example, a specific individual CryptoKitty may be a non-fungible digital asset. A digital asset may be semi-fungible if there is a set of a limited number of similar but distinguishable digital assets. For example, a limited-edition Blanko or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, both non-fungible and semi-fungible digital assets are considered as "not fungible" digital assets. In some implementations, semi-fungible digital assets may share the same or similar data as other digital assets, but have at least a unique identifier, and/or other distinguishable asset-specific information.

In some implementations, system 100 may include one or more servers 102, one or more client computing devices 104, one or more distributed ledgers 111, one or more gaming platforms 105, one or more user interfaces 125, one or more external resources 128, and/or other components. Server(s) 102 may be configured to communicate with one or more client computing devices 104 according to a client/server architecture and/or other architectures. Client computing device(s) 104 may be configured to communicate with other client computing devices via server(s) 102 and/or according to a peer-to-peer architecture and/or other architectures. Users 123 may access system 100 via client computing device(s) 104. Users 123 may include a first user, a second user, a third user, and so forth. Individual client computing devices 104 may be associated with individual users. For example, a first client computing device 104 may be associated with the first user, a second client computing device 104 may be associated with the second user, and so forth. Individual user interfaces 125 may be associated with individual users. For example, a first user interface 125 may be associated with the first user, a second user interface 125 may be associated with the second user, and so forth. Individual user interfaces 125 may be associated with individual client computing devices 104. For example, a first user interface 125 may be associated with the first client computing devices 104, a second user interface 125 may be associated with the second client computing devices 104, and so forth. In some implementations, user access to system 100 may be facilitated through individual user accounts that are associated with individual users.

Ledgers, such as distributed ledger 111, may provide and/or produce a secure record or registry of ownership of assets, transactions, and other information. In some implementations, a ledger may be implemented as a database. For example, a blockchain is a type of ledger, as well as a type of decentralized database that stores a registry of assets and transactions. Blockchain technology may be used for cryptocurrencies, smart contracts, and/or other applications for a decentralized database. In some implementations, distributed ledger 111 may be configured to facilitate sharing information among users in different physical locations, using different computing devices and/or platforms. Distributed ledger 111 may be configured to facilitate sharing control and/or hosting responsibilities of shared information among multiple users, e.g., to prevent a single point of failure. In some implementations, distributed ledger 111 may include and/or implement a blockchain. Individual assets and/or smart contracts stored on distributed ledger 111 may be accessible through individual addresses.

In some implementations, distributed ledger 111 may store a registry of (digital) assets and transactions across one or more networks 13, including but not limited to the internet and/or other networks. Assets may be owned by users 123. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights. Tokens are a type of (typically fungible) asset. In some implementations, tokens may include one or more of security tokens, utility tokens, payment tokens, initial coin offering (ICO) tokens, virtual currency tokens, crypto tokens, ERC-20 tokens, EOS tokens, and/or other (fungible) tokens. In some implementations, tokens not only represent value, but may have a specific use in a particular distributed computing platform, e.g., in the operation of distributed ledger 111.

In some implementations, distributed ledger 111 may record ownership of assets. Alternatively, and/or simultaneously, distributed ledger 111 may record transactions that modify ownership of assets. A smart contract may be a type of asset and/or a class of assets. In some implementations, certain types of assets may be implemented as smart contracts on distributed ledger 111. For example, a particular smart contract may implement a particular asset such that the particular asset's value is defined within the particular smart contract. For example, a particular smart contract may implement a particular asset such that the particular asset's ownership is defined within the particular smart contract.

In some implementations, operations and/or transactions involving these assets may be implemented as function calls to a smart contract. For example, a user may invoke a particular operation and/or transaction by transferring an amount of consideration to a particular address associated with a particular smart contract such that distributed ledger 111 executes the particular operation and/or transaction. In some implementations, distributed ledger 111 may be configured to interoperate with components external to distributed ledger 111, including but not limited to an external file system, storage, and/or other external components. For example, assets recorded on distributed ledger 111 may be configured to invoke executable code (or effectuate the invocation of executable code) that is executed external to distributed ledger 111, or that is executed at least in part external to distributed ledger 111. For example, a particular asset may use an external function call to execute code externally to distributed ledger 111 that returns a value and/or object to the code of the particular asset. Through such a mechanism less code may need to be executed on distributed ledger 111, which may increase efficiency and/or speed, decrease cost, and/or both.

In some implementations, once a smart contract has been added to distributed ledger 111, the smart contract may be referred to as published, posted, and/or recorded. In some implementations, elements of distributed ledger 111 may be grouped together in units that are referred to as blocks. Individual blocks may be linked or chained together to form a structure of blocks and/or a hierarchy of blocks, such as, e.g., a chain of blocks. An individual block may include one or more assets and one or more transactions. In some implementations, elements of distributed ledger 111 may be linked together in a manner that prevents tampering, such as, e.g., a hash chain. Individual elements and/or transactions may be linked or chained together to form a structure and/or a hierarchy of elements and/or transactions.

In some implementations, distributed ledger 111 may be publicly accessible and append-only. In some implementations, existing blocks of distributed ledger 111 can substantially not be altered or deleted, unless multiple copies of the database are altered. This may be unlikely to happen provided that multiple copies and/or versions of the database are stored on different computing platforms, e.g., in different geographical locations. In some implementations, distributed ledger 111 may be replicated on multiple computing platforms, preferably in multiple different geographical locations. As used herein, the term "distributed" may refer to multiple computing platforms located in multiple separate and distinct geographical locations operating together to provide particular functionality, such as, e.g., in the case of a particular distributed database, the functionality of a blockchain. In some implementations, a blockchain or another structure of blocks may be maintained by a distributed computing platform (not shown in FIG. 1). In some implementations, the distributed computing platform may be implemented by a set of client computing platforms and/or computing platforms. The distributed computing platform may support a virtual machine (not shown in FIG. 1). The distributed computing platform and/or the virtual machine may form a runtime environment for smart contracts. In some implementations, the distributed computing platform may include electronic storage configured to store part or all of distributed ledger 111. The smart contracts may be stored on distributed ledger 111. In some implementations, the distributed computing platform may be Ethereum. In some implementations, the distributed computing platform may be the EOSIO platform. In some implementations, the virtual machine may be decentralized.

Server(s) 102 may be configured by machine-readable instructions 106. Machine-readable instructions 106 may include one or more instruction components. The instruction components may include computer program components. The instruction components may include one or more of an asset component 108, an encoding component 110, a signature component 112, a metadata component 114, a retrieval component 116, an extraction component 118, a blockchain component 120, a verification component 122, a decoding component 124, and/or other instruction components.

Asset component 108 may be configured to electronically store information in electronic storage 130. In some implementations, stored information may include information regarding one or more types of digital assets. One or more of the types of digital assets may be non-fungible digital assets. For example, a non-fungible digital asset may be a unique digital asset, limited-edition in-game character, a ticket to an event, and/or another asset that is semi-fungible or not fungible. In some implementations, one or more types of digital assets may be implemented as one or more smart contracts on distributed ledger 111. In some implementations, an individual smart contract may be deployed (and/or otherwise recorded) for a particular class or type of digital assets, and the individual smart contract subsequently creates and/or issues individual (instances of) digital assets of the particular class or type. In some implementations, an individual smart contract may be associated with one or more cryptographic keys. For example, a given smart contract may be associated with a keypair of cryptographic keys including a public key and a private key. In some implementations, an individual digital asset may be associated with one or more cryptographic keys. For example, a given digital asset may be associated with a keypair of cryptographic keys including a public key and a private key. In some implementations, the stored information may include a set of a limited number of digital assets of a given type of digital asset. In some implementations, the limited number may be 1, about 5, about 10, about 100, about 1000, about 10000, about 100000, less than 1 million, and/or another limited number. In some implementations, different digital assets of the same given class or type may be distinguishable, e.g., through an asset-specific identifier. For example, a class of 10 digital assets may use identifiers "1" through "10" to distinguish individual digital assets. In some implementations, individual digital assets may be associated with metadata pertaining to the individual digital assets. For example, a given digital asset may be associated with given metadata. In some implementations, metadata may include an asset-specific identifier, asset-specific information, and/or common information shared among different digital assets of the same class or type. In some implementations, a first smart contract on distributed ledger 111 may implement a first type of semi-fungible digital asset (say, limited-edition 3-dimensional in-game characters), a second smart contract on distributed ledger 111 may implement a second type of semi-fungible digital assets (say, a limited number of tickets to a particular concert), a third smart contract may implement a third type of non-fungible digital asset, and so forth.

In some implementations, distributed ledger 111 may be configured such that individual smart contracts are similar to individual user accounts. For example, a given user account may inherently have a public key in cases where the address and/or account identifier of a given account is mathematically derived from the public key. In some implementations, individual accounts (such as a given smart contract) may be queried to provide their public key. In some implementations, an account-specific cryptographic key or keypair may be generated upon creation of a given account. In some implementations, an asset-specific cryptographic key or keypair may be generated upon creation and/or issuance of a given digital asset. In some implementations, the metadata of a given digital asset may include a cryptographic key or keypair (e.g., a public key and a private key) specific to the given digital asset. For example, in some implementations, a first smart contract may be associated with a first key (or keypair), a second smart contract may be associated with a second key (or keypair), a third smart contract may be associated with a third key or keypair), and so forth. For example, in some implementations, the metadata of a first digital asset of the class or type of the first smart contract may include a particular key, the metadata of a second digital asset of the same class or type may include a different key, and so forth.

Encoding component 110 may be configured to generate quantities of encoded information. In some implementations, a generated quantity may be account-specific (i.e., specific to a given smart contract). In some implementations, a generated quantity may be asset-specific (i.e., specific to a given digital asset). In some implementations, generation by encoding component 110 may be based on one or more private keys, such as a given private key associated with a given smart contract. In some implementations, a given quantity of generated encoded information (for a given digital asset) may be based on encoding some combination that includes at least an account identifier (or identifier of a smart contract) and an asset-specific identifier of an individual digital asset. For example, the combination may include a concatenation of a first identifier of a given smart contract and a second identifier of a given digital asset of the type that is implemented by the given smart contract. Other combinations are envisioned within the scope of this disclosure. In some implementations, encoding may be base64 encoding. In some implementations, encoding by encoding component 110 may be a reversible and lossless permutation, e.g., of an input string (either alphanumeric, digital, and/or otherwise). In some implementations, even if the generated quantities of encoded information of multiple digital assets of the same class or type are based on the same shared key or shared account-specific identifier, these generated quantities of encoded information may be distinguishable by virtue of using and/or otherwise being based on different asset-specific identifiers of the multiple digital assets.

Signature component 112 may be configured to generate digital signatures of information, including but not limited to quantities of encoded information, quantities of encrypted and/or hashed information, and/or other quantities of information. For example, a given digital signature of a given quantity of encoded information may be based on a given account-specific private key. In some implementations, all or part of a given quantity of information may be hashed by a one-way encryption function, e.g., prior to generation of a given digital signature. In some implementations, a digital signature of a quantity of asset-specific information may be referred to as a certificate of authenticity. In some implementations, even if the generated digital signatures of multiple digital assets of the same class or type are based on the same shared key or shared account-specific identifier, these generated digital signatures may be different and distinguishable by virtue of using and/or otherwise being based at least in part on different asset-specific identifiers of the multiple digital assets. In some implementations, generated digital signatures may be asset-specific. For example, in some implementations, the digital signature associated with a first digital asset of the class or type of the first smart contract may be different from the digital signature associated with a second digital asset of the same class or type, and so forth.

Metadata component 114 may be configured to store and/or record information, including but not limited to account-specific information, asset-specific information, and/or other information (as well as combinations thereof). For example, metadata component 114 may be configured to record a given quantity of information as part of the metadata of a given digital asset. For example, metadata component 114 may be configured to record a digital signature (e.g., as generated by signature component 112) as part of the metadata of a given digital asset. In some implementations, asset-specific metadata may include a first part that is recorded on distributed ledger 111 and a second part that is not recorded on distributed ledger 111. In some implementations, a link, reference, or uniform resource locator (URL) of the second part may be stored on distributed ledger 111.

In some implementations, metadata component 114 may be configured to create images that visually depict digital signatures. In some implementations, a given image that depicts a given digital signature may be stored and/or recorded as part of asset-specific metadata, e.g. through a URL.

Figure 4A:
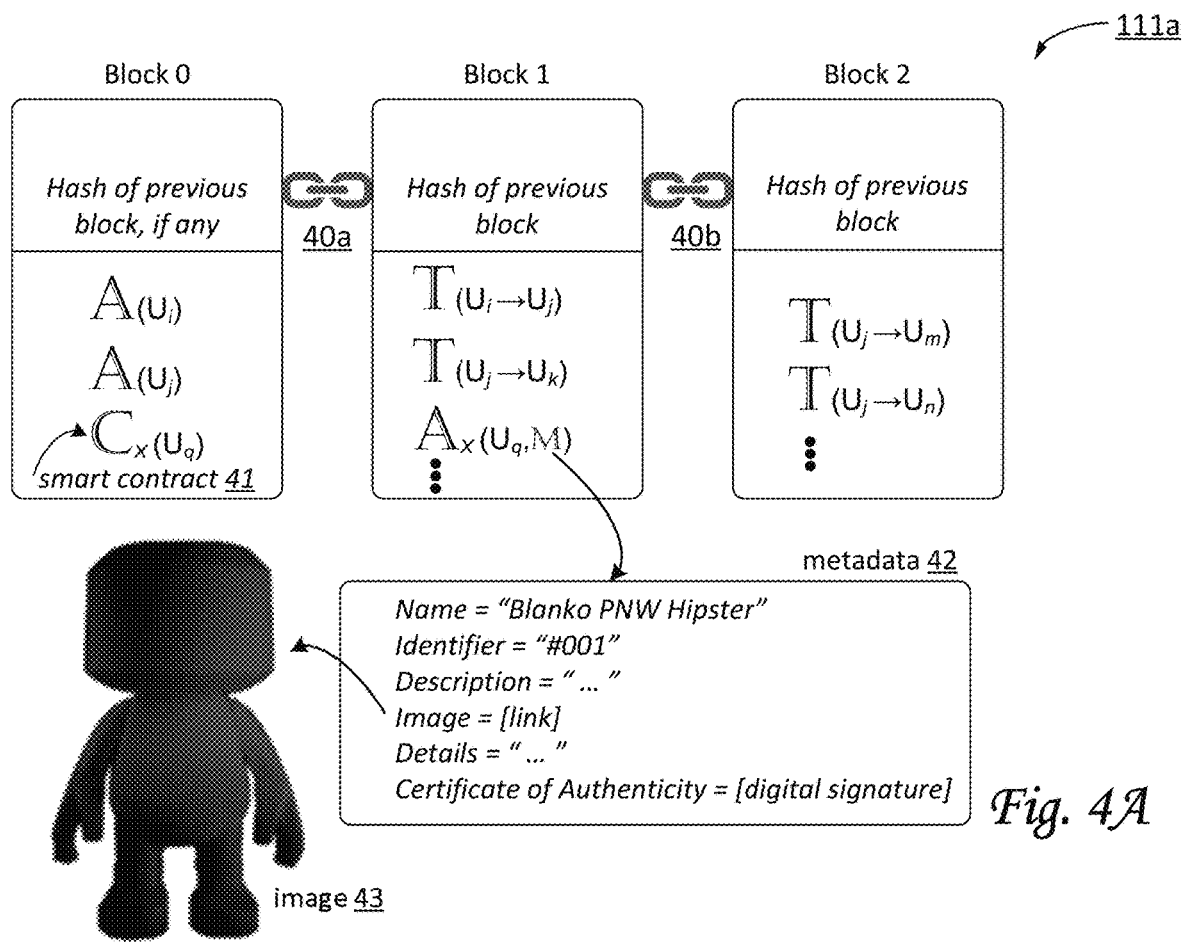
FIGS. 4A-4B illustrate exemplary blockchains as may be used by a system configured to provide and/or determine authenticity of digital assets, in accordance with one or more implementations.

By way of non-limiting example, FIG. 4A illustrates a blockchain 111a that implements a blockchain including a block 0, a block 1, and a block 2. As time progresses, more blocks may be added to blockchain 111a. The blocks within blockchain 111a are ordered. As shown in block 0, three assets (indicated by a capital "A" or "C") are created and/or generated, and subsequently assigned to three users or players: a first asset is assigned to user i (Ui), a second asset is assigned to user j (Uj), and a third asset is a smart contract 41 (indicated by a capital "C") that is assigned to or owned by user q (Uq). Smart contract 41 may implement a limited number of digital assets of a given type "X". A function call to a function defined by smart contract 41 (e.g., to request a particular type of usage, creation, and/or issuance of a digital asset of type "X") may be depicted and/or implemented as a transaction (e.g., the function may be invoked in exchange for consideration). In some implementations, smart contract 41 may have been posted to blockchain 111a by (or on behalf of) an owner or creator (here, user q). As used in the context of blockchains, assignments may be recordations of ownership. These assets and smart contracts may be individually manifested, deployed, and/or instantiated through an asset component similar to asset component 108 (see FIG. 1). Block 1 is connected to block 0 (as indicated by a link 40a), for example by including an address of block 1 in block 0, or vice versa. Likewise, block 1 is connected to block 2, as indicated by a link 40b.

In block 1, one asset (labeled Ax) is assigned to user q (Uq), for example by associating an address of user q to asset Ax. For example, the asset in block 1 may be an individual asset created by an asset component similar to asset component 108 (see FIG. 1). Asset Ax may represent an individual digital asset of type "X". Asset Ax may be created and/or issued by invoking one or more function calls to smart contract 41. Asset Ax may have associated metadata 42 (indicated by a capital "M"), which may include and/or link to different types of information, including but not limited to one or more of a name, identifier, description, an image 43, (in-game) details, certificate of authenticity, and/or other information, as depicted. For example, the certificate of authenticity may be a digital signature create by a signature component similar to signature component 112 (see FIG. 1). Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111a may determine the current assets of blockchain 111a, and the balances of any user. In some implementations, the balance of a particular user may be verified prior to adding a transaction that reduces that particular user's balance. For example, an individual user may not be allowed to transfer assets the individual user does not own.

Figure 4B:
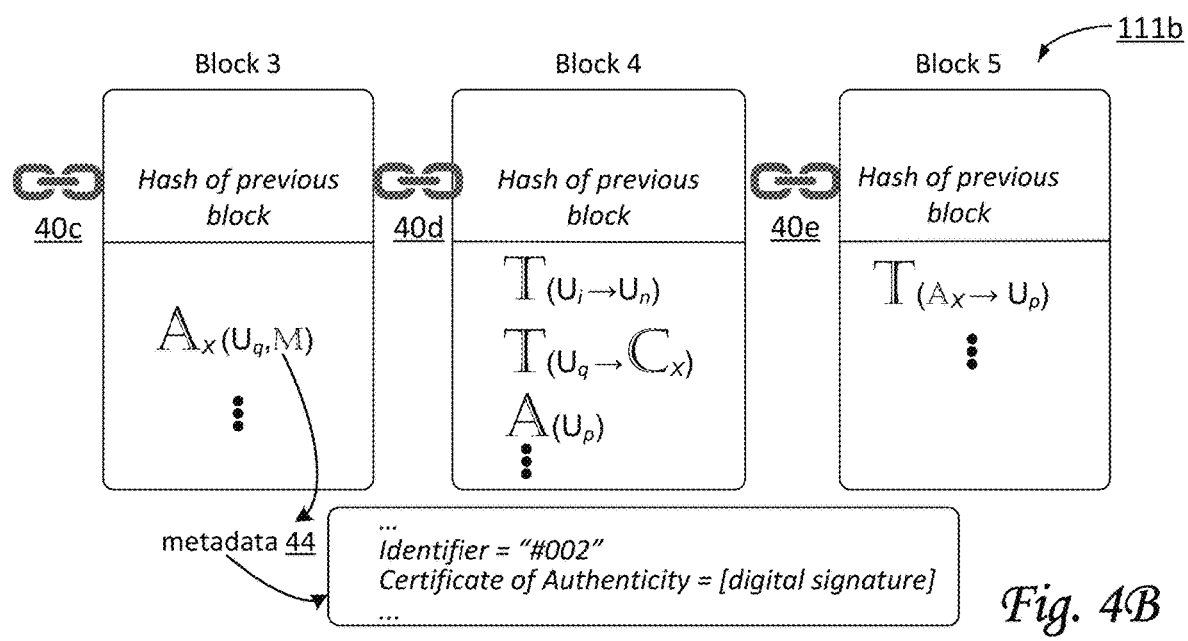

By way of non-limiting example, FIG. 4B illustrates a blockchain 111b that includes the same blocks as blockchain 111a of FIG. 4A, plus additional blocks (block 3, block 4, block 5) that have been appended to the blockchain. Block 3 may be connected to block 2 (as indicated by a link 40c), block 4 may be connected to block 3 (as indicated by a link 40d), and block 5 may be connected to block 4 (as indicated by a link 40e). In block 3, another asset (labeled Ax, having associated metadata 44) of type "X" is assigned to user q (Uq). At least the identifier (here, "#002") and the certificate of authenticity in metadata 44 will be different than the identifier and the certificate of authenticity in metadata 42 of FIG. 4A. In block 4, one asset is assigned to user p (Up). Additionally, block 4 includes a transaction (indicated by a capital "T"): a transaction from user i to user n. For example, the transaction may represent a purchase of a first virtual item by user n. Additionally, block 4 includes a transaction from user q to the same smart contract as depicted in block 3. For example, the transaction may represent user q requesting a particular usage of one or more assets of the given type "X". Block 5 includes a transaction (indicated by a capital "T"), representing a transfer of ownership of a particular asset of the given type "X" from old owner user q to new owner user p.

Referring to FIG. 1, retrieval component 116 may be configured to obtain and/or otherwise retrieve information, including but not limited to information specific to a given account, a given smart contract, a given digital asset, and/or other information. For example, obtained information may include an identifier of a given smart contract that implements a given type of digital assets. The given smart contract may be associated with a given public key. For example, obtained information may include the metadata of a given digital asset. In some implementations, obtained information may be retrieved from digital ledger 111, external electronic storage (e.g., accessible through a URL), and/or other storage.

Extraction component 118 may be configured to extract information, e.g., from information retrieved by retrieval component 116. In some implementations, extraction component 118 may be configured to extract a given digital signature from some given metadata. In some implementations, extraction component 118 may be configured to extract a given quantity of (encoded) information from some given metadata.

Blockchain component 120 may be configured to perform actions on distributed ledger 111, including but not limited to recording transactions/transfers of assets, recording and/or verifying ownership of assets, recording changes in ownership, analyzing ownership of particular assets (e.g., through the history of recorded transactions), and/or other actions. For example, in some implementations, components of system 100 may use one or more functions provided by blockchain component 122 to perform one or more of the actions and/or features attributed to system 100, including but not limited to obtaining, extracting, or monitoring transactions. For example, a verification of asset-ownership may be implemented as a function on a particular smart contract. Moreover, a transfer of ownership may be implemented by recording and/or storing an address (that identifies the new owner of a particular asset) to distributed ledger 111 and/or the particular smart contract.

Verification component 122 may be configured to perform one or more types of verifications, including but not limited to verifications pertaining to metadata. For example, in some implementations, verification component 122 may be configured to verify whether a given digital signature corresponds to a given quantity of information that is signed by the given signature. In some implementations, verifications by verification component 122 may be based on public keys, in particular the given public key associated with a given digital asset. In some implementations, a given digital signature may correspond if a newly created digital signature of the given quantity of information perfectly matches the given digital signature. In some implementations, a given digital signature may correspond if encrypting the given digital signature with the pertinent public key produces a (hashed) version of the given quantity of information (and/or a verifiable permutation thereof). In some implementations, the encrypted message (here, the given quantity of information) need not be decrypted to verify that only the owner of the pertinent private key could have generated the given digital signature. Other types, styles, and mechanisms of encryption, decryption, and verification of digital signatures are envisioned within this disclosure, including those based on RSA (Rivest, Shamir, and Adleman), elliptic curve cryptography, and/or other types of cryptography. Decoding component 124 may be configured to generate quantities of decoded information. In some implementations, decoding component 124 may be configured to decode certain information from obtained and/or extracted information (e.g., as produced by retrieval component 116, extraction component 118, and/or another component of system 100). In some implementations, decoding component 124 may be configured to perform the reverse operation compared to encoding component 110. For example, decoded information may include one or more of an identifier of a given smart contract, an identifier of a given digital asset, and/or other information.

In some implementations, verification component 122 may be configured to verify whether decoded information includes certain expected information. For example, verification component 122 may verify whether a decoded identifier of a given smart contract matches the recorded identifier of the given smart contract. For example, verification component 122 may verify whether a decoded identifier of a given digital asset matches the recorded identifier of the given digital asset.

As used herein, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function.

User interfaces 125 may be configured to facilitate interaction between users and system 100 and/or between users and client computing platforms 104. For example, user interfaces 125 may provide an interface through which users may provide information to and/or receive information from system 100. In some implementations, individual user interfaces 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, a user may enter write requests (or information that forms the basis for a write request) as described herein, as may be received by request receiving component 108. In some implementations, a user may enter read requests (or information that forms the basis for a write request) as described herein, as may be received by request receiving component 108. In some implementations, a user may be provided with information resulting from a particular read request, such as the contents of one or more previously stored updates of a particular asset. In some implementations, one or more user interfaces 125 may be included in one or more client computing platforms 104. In some implementations, one or more user interfaces 125 may be included in system 100.

In some implementations, an individual asset may be accessible through an individual address on distributed ledger 111. In some implementations, the individual asset may be associated with a physical object. The physical object may include scannable information, such as a QR code, which may refer to the individual address of the individual asset on distributed ledger 111. Based on the individual address, the history of the individual asset may be retrieved and provided to a user, e.g., on user interface 125.

In some implementations, server(s) 102, client computing device(s) 104, and/or external resources 128 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing device(s) 104, and/or external resources 128 may be operatively linked via some other communication media.

A given client computing device 104 may include one or more processors configured to execute computer program components. The computer program components may be configured to enable an expert or user associated with the given client computing device 104 to interface with system 100 and/or external resources 128, and/or provide other functionality attributed herein to client computing device(s) 104. By way of non-limiting example, the given client computing device 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, external resources 128 may include one or more applications. Individual ones of the one or more applications may include applications external to distributed ledger 111, and/or other components of system 100. The applications may include one or more of a user authentication application, a device authentication application, a client application, and/or other applications. The applications may be configured to be executed on client computing devices 104. In some implementations, the applications may be configured to interact with (executable code that is executed on) distributed ledger 111. In some implementations, the applications may be configured to interact with an external (content-addressable) file system.

In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing device(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, and/or 124, and/or other components. Processor(s) 132 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 132 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 132 may be configured to execute one or more additional components that may perform some or all of the functionality attributed below to one of components 108, 110, 112, 114, 116, 118, 120, 122, and/or 124.

Figure 2:
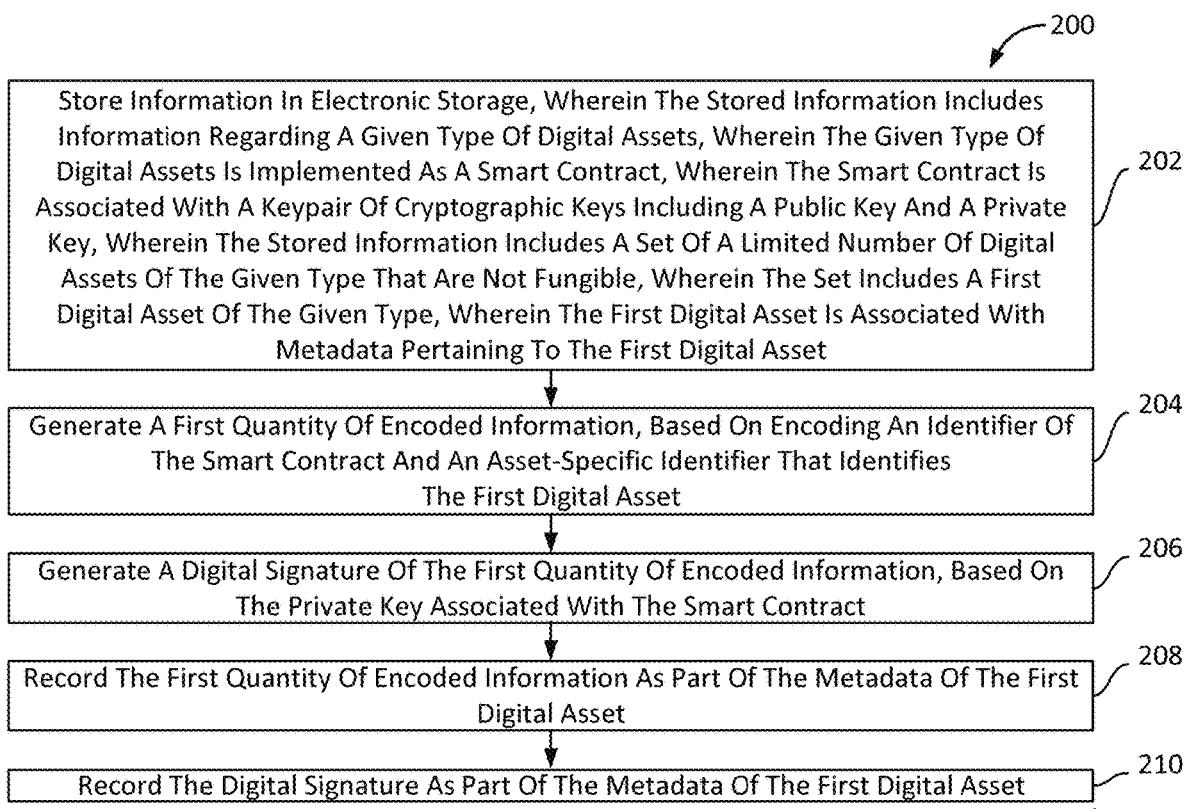
FIGS. 2-3 illustrate methods for providing and/or determining authenticity of digital assets that are not fungible, in accordance with one or more implementations.
Figure 3:

FIGS. 2-3 illustrate methods 200 and 300 for providing and determining authenticity of digital assets that are not fungible, in accordance with one or more implementations. The operations of methods 200-300 presented below are intended to be illustrative. In some implementations, methods 200-300 may be accomplished with one or more additional operations not described, and/or without one or more of the operations discussed. Additionally, the order in which the operations of methods 200-300 are illustrated in FIGS. 2-3 and described below is not intended to be limiting.

In some implementations, methods 200-300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 200-300 in response to instructions stored electronically on an electronic storage medium. The one or more processing devices may include one or more devices configured through hardware, firmware, and/or software to be specifically designed for execution of one or more of the operations of methods 200-300.

Regarding method 200, at an operation 202, information may be stored in electronic storage. The stored information includes information regarding a given type of digital assets. The given type of digital assets is implemented as a smart contract on a distributed ledger. The smart contract is associated with a keypair of cryptographic keys including a public key and a private key. The stored information includes a set of a limited number of digital assets of the given type that are not fungible such that individual ones of the set of the limited number of digital assets are distinguishable. The set includes a first digital asset of the given type. The first digital asset is associated with metadata pertaining to the first digital asset. In some embodiments, operation 202 is performed by an asset component the same as or similar to asset component 108 (shown in FIG. 1 and described herein).

At an operation 204, a first quantity of encoded information is generated. Generation is based on encoding an identifier of the smart contract and an asset-specific identifier that identifies the first digital asset. In some embodiments, operation 204 is performed by an encoding component the same as or similar to encoding component 110 (shown in FIG. 1 and described herein).

At an operation 206, a digital signature is generated of the first quantity of encoded information. The digital signature is based on the private key associated with the smart contract. In some embodiments, operation 206 is performed by a signature component the same as or similar to signature component 112 (shown in FIG. 1 and described herein).

At an operation 208, the first quantity of encoded information is recorded as part of the metadata of the first digital asset. In some embodiments, operation 208 is performed by a metadata component the same as or similar to metadata component 114 (shown in FIG. 1 and described herein).

At an operation 210, the digital signature is recorded as part of the metadata of the first digital asset. In some embodiments, operation 210 is performed by a metadata component the same as or similar to metadata component 114 (shown in FIG. 1 and described herein).

Regarding method 300, at an operation 302, an identifier is obtained of a smart contract. The smart contract implements a given type of a limited number of digital assets on a distributed ledger that are not fungible such that individual ones of the set of the limited number of digital assets are distinguishable. The smart contract is associated with a keypair of cryptographic keys including a public key and a private key. The limited number of digital assets include a first digital asset. In some embodiments, operation 302 is performed by a retrieval component the same as or similar to retrieval component 116 (shown in FIG. 1 and described herein).

At an operation 304, metadata is obtained of the first digital asset. The metadata is associated with and at least in part specific to the first digital asset. The metadata includes an asset-specific identifier that identifies the first digital asset. In some embodiments, operation 304 is performed by a retrieval component the same as or similar to retrieval component 116 (shown in FIG. 1 and described herein).

At an operation 306, a digital signature and a first quantity of extracted information is extracted from the metadata. In some embodiments, operation 306 is performed by an extraction component the same as or similar to extraction component 118 (shown in FIG. 1 and described herein).

At an operation 308, it is verified whether the digital signature corresponds to the first quantity of extracted information. Verification is based on the public key. In some embodiments, operation 308 is performed by a verification component the same as or similar to verification component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for determining authenticity of digital assets that are non-fungible digital assets, the method comprising:
storing information in electronic storage, wherein the stored information includes information regarding a given type of digital assets, wherein the given type of digital assets is implemented as a smart contract on a decentralized database, wherein the smart contract is associated with a keypair of cryptographic keys including a public key and a private key, wherein the stored information includes a set of a limited number of digital assets of the given type that are non-fungible digital assets such that individual ones of the set of the limited number of digital assets are distinguishable, wherein the set includes a first digital asset of the given type, wherein the first digital asset is associated with metadata specific to the first digital asset, wherein the metadata includes a first part and a second part;
generating a first quantity of encoded information, wherein generation is based on encoding an identifier of the smart contract and an asset-specific identifier that identifies the first digital asset;
generating a digital signature of the first quantity of encoded information, wherein generation of the digital signature is based on the private key associated with the smart contract;
recording, on the decentralized database, the first quantity of encoded information and the digital signature in the first part of the metadata of the first digital asset;
storing the second part of the metadata of the first digital asset in electronic storage that is external to the decentralized database; and
recording, on the decentralized database, a Uniform Resource Locator (URL) that refers to a location of the second part of the metadata as stored in the electronic storage, wherein the URL is recorded on the decentralized database, in the first part of the metadata of the first digital asset.

2. The method of claim 1, wherein the encoding used to generate the first quantity of encoded information is base64 encoding.

3. The method of claim 1, wherein the limited number of digital assets represent admission tickets to a show or concert.

4. The method of claim 1, wherein the limited number of digital assets represent in-game assets that are usable within an online gaming platform.

5. The method of claim 1, wherein recording the digital signature includes creating an image that visually depicts the digital signature and recording the image as part of the metadata of the first digital asset.

6. The method of claim 5, wherein a uniform resource locator (URL) that locates the image is recorded on the decentralized database, and wherein the image is not recorded on the decentralized database.

7. The method of claim 1, wherein the set includes a second digital asset of the given type, wherein the second digital asset is associated with second metadata pertaining to the second digital asset, the method further comprising:
generating a second quantity of encoded information, wherein generation of the second quantity of encoded information is based on encoding the identifier of the smart contract and a second asset-specific identifier that identifies the second digital asset;
generating a second digital signature of the second quantity of encoded information, wherein generation of the second digital signature is based on the private key associated with the smart contract, and wherein the second digital signature is different from the digital signature of the first quantity of encoded information; and
recording, on the decentralized database, the second quantity of encoded information and the second digital signature, as part of the second metadata.

8. The method of claim 1, wherein the first quantity of encoded information is hashed using a hashing function prior to the generation of the digital signature.

9. A method for determining authenticity of digital assets that are non-fungible digital assets, the method comprising:
obtaining an identifier of a smart contract, wherein the smart contract implements a given type of a limited number of digital assets that are recorded on a decentralized database, wherein the digital assets are non-fungible digital assets such that individual ones of the set of the limited number of digital assets are distinguishable, wherein the smart contract is associated with a keypair of cryptographic keys including a public key and a private key, wherein the limited number of digital assets include a first digital asset;
obtaining metadata that is specific to the first digital asset, wherein the metadata is associated with and at least in part specific to the first digital asset, wherein the metadata includes a first part and a second part, wherein the first part has been recorded on the decentralized database, wherein the second part has been stored in external electronic storage that is external to the decentralized database, wherein the first part of the metadata includes a Uniform Resource Locator (URL) that refers to a location of the second part of the metadata as stored in the external electronic storage, wherein the metadata includes an asset-specific identifier that identifies the first digital asset;
extracting a digital signature and a first quantity of extracted information from the first part of the metadata; and
verifying whether the digital signature corresponds to the first quantity of extracted information, wherein verification is based on the public key.

10. The method of claim 9, further comprising:
generating a first quantity of decoded information, wherein generation of the first decoded identifier is based on decoding the first quantity of extracted information.

11. The method of claim 10, wherein the decoding used to generate the first quantity of decoded information is base64 decoding.

12. The method of claim 10, further comprising:
verifying whether the first quantity of decoded information includes the identifier of the smart contract.

13. The method of claim 10, further comprising:
verifying whether the first quantity of decoded information includes the asset-specific identifier that identifies the first digital asset.

14. The method of claim 9, wherein the limited number of digital assets represent admission tickets to a show or concert.

15. The method of claim 9, wherein the limited number of digital assets represent in-game assets that are usable within an online gaming platform.

16. A system configured to determine authenticity of digital assets that are non-fungible digital assets, the system comprising:

electronic storage configured to electronically store information, wherein the stored information includes information regarding a given type of digital assets, wherein the given type of digital assets is implemented as a smart contract on a decentralized database, wherein the smart contract is associated with a keypair of cryptographic keys including a public key and a private key, wherein the stored information includes a set of a limited number of digital assets of the given type that are non-fungible digital assets such that individual ones of the set of the limited number of digital assets are distinguishable, wherein the set includes a first digital asset of the given type, wherein the first digital asset is associated with metadata specific to the first digital asset, wherein the metadata includes a first part and a second part; and one or more hardware processors configured via machine-readable instructions to:

generate a first quantity of encoded information, wherein generation is based on encoding an identifier of the smart contract and an asset-specific identifier that identifies the first digital asset;

generate a digital signature of the first quantity of encoded information, wherein generation of the digital signature is based on the private key associated with the smart contract;

record, on the decentralized database, the first quantity of encoded information and the digital signature in the first part of the metadata of the first digital asset;

store the second part of the metadata of the first digital asset in electronic storage that is external to the decentralized database; and record a Uniform Resource Locator (URL) that refers to a location of the second part of the metadata as stored in the electronic storage, wherein the URL is recorded on the decentralized database, in the first part of the metadata of the first digital asset.

17. A system configured to determine authenticity of digital assets that are non-fungible digital assets, the system comprising:

one or more hardware processors configured via machine-readable instructions to:

obtain an identifier of a smart contract, wherein the smart contract implements a given type of a limited number of digital assets that are recorded on a decentralized database, wherein the digital assets are non-fungible digital assets such that individual ones of the set of the limited number of digital assets are distinguishable, wherein the smart contract is associated with a keypair of cryptographic keys including a public key and a private key, wherein the limited number of digital assets include a first digital asset;

obtain metadata that is specific to the first digital asset, wherein the metadata is associated with and at least in part specific to the first digital asset, wherein the metadata includes a first part and a second part, wherein the first part has been recorded on the decentralized database, wherein the second part has been stored in external electronic storage that is external to the decentralized database, wherein the first part of the metadata includes a Uniform Resource Locator (URL) that refers to a location of the second part of the metadata as stored in the external electronic storage, wherein the metadata includes an asset-specific identifier that identifies the first digital asset;

extract a digital signature and a first quantity of extracted information from the first part of the metadata; and verify whether the digital signature corresponds to the first quantity of extracted information, wherein verification is based on the public key.

\* \* \* \* \*